(12) United States Patent
Szuba

(10) Patent No.: US 8,840,310 B2
(45) Date of Patent: Sep. 23, 2014

(54) CAGELESS BEARINGS FOR USE WITH MECHANICAL DEVICES

(71) Applicants: Szuba Consulting, Inc., Dearborn, MI (US); Value Extraction LLC, Dearborn, MI (US)

(72) Inventor: Joseph Szuba, Dearborn, MI (US)

(73) Assignees: Szuba Consulting, Inc., Dearborn, MI (US); Value Extraction LLC, Dearborn, MI (US)

(*) Notice: Subject to any disclaimer, the term of this patent is extended or adjusted under 35 U.S.C. 154(b) by 0 days.

(21) Appl. No.: 14/079,256

(22) Filed: Nov. 13, 2013

(65) Prior Publication Data

US 2014/0072255 A1  Mar. 13, 2014

Related U.S. Application Data

(63) Continuation-in-part of application No. 14/021,251, filed on Sep. 9, 2013.

(60) Provisional application No. 61/697,928, filed on Sep. 7, 2012.

(51) Int. Cl.
F16C 19/00 (2006.01)
F16C 43/08 (2006.01)
F16C 19/50 (2006.01)

(52) U.S. Cl.
CPC .............. *F16C 19/507* (2013.01); *F16C 43/083* (2013.01)
USPC ....................................................... 384/445

(58) Field of Classification Search
USPC ......... 384/445, 456, 490, 507, 508, 513, 516, 384/548, 549, 590, 593, 618, 621–623, 384/207–209, 527, 573, 578, 614
See application file for complete search history.

(56) References Cited

U.S. PATENT DOCUMENTS

| | | | |
|---|---|---|---|
| 2,983,557 A * | 5/1961 | Blinder | 384/475 |
| 4,039,231 A | 8/1977 | Di Loreto | |
| 4,077,683 A | 3/1978 | Bhateja et al. | |
| 4,120,542 A | 10/1978 | Bhateja et al. | |
| 4,494,802 A * | 1/1985 | Henson | 384/19 |
| 4,886,377 A * | 12/1989 | Adachi et al. | 384/49 |

(Continued)

FOREIGN PATENT DOCUMENTS

GB  2136887  *  9/1984

OTHER PUBLICATIONS

PCT/US13/58474 International Search Report dated Feb. 18, 2014, 2 pages.
PCT/US13/58474 Written Opinion dated Feb. 18, 2014, 4 pages.

*Primary Examiner* — James Pilkington
(74) *Attorney, Agent, or Firm* — Warner Norcross & Judd LLP

(57) ABSTRACT

A rotational assembly includes a mating surface and an interlocking surface disposed in driving engagement with a cooperable interlocking member of a driving mechanism. A plurality of receptors is defined in the mating surface. A bearing element is received in each of the plurality of receptors for reducing frictional interaction between the mating surface of the rotational assembly and a complementary mating surface of an interacting component. A retainer is defined in the mating surface at each of the receptors providing rotational retention of each of the bearing elements within its corresponding receptor.

10 Claims, 7 Drawing Sheets

(56) References Cited

U.S. PATENT DOCUMENTS

| | | | |
|---|---|---|---|
| 4,907,899 A | 3/1990 | Rhoads | |
| 5,110,223 A | 5/1992 | Koch et al. | |
| 5,302,032 A * | 4/1994 | Niwa et al. | 384/454 |
| 5,332,317 A * | 7/1994 | Niwa et al. | 384/548 |
| 5,358,454 A | 10/1994 | Bowen et al. | |
| 5,518,322 A * | 5/1996 | Hicks | 384/544 |
| 6,027,423 A | 2/2000 | Bell | |
| 6,367,983 B1 | 4/2002 | Muntnich et al. | |
| 6,408,719 B1 | 6/2002 | Seki et al. | |
| 6,702,469 B1 * | 3/2004 | Taniguchi et al. | 384/418 |
| 7,104,699 B2 | 9/2006 | Shattuck et al. | |
| 7,175,350 B2 * | 2/2007 | Gradu et al. | 384/557 |
| 7,845,857 B2 | 12/2010 | Shattuck et al. | |
| 7,866,454 B2 | 1/2011 | Saka | |
| 8,147,371 B2 | 4/2012 | Hirota et al. | |
| 2005/0058382 A1 | 3/2005 | Williams | |
| 2010/0061675 A1 | 3/2010 | Endres et al. | |
| 2010/0111460 A1 * | 5/2010 | Albrecht et al. | 384/572 |
| 2010/0172606 A1 | 7/2010 | Lunz et al. | |

* cited by examiner

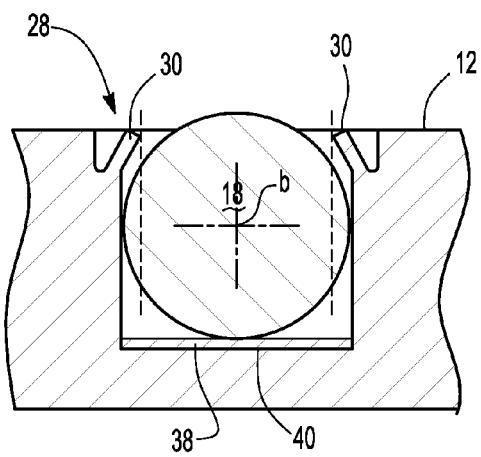
*Fig-9*
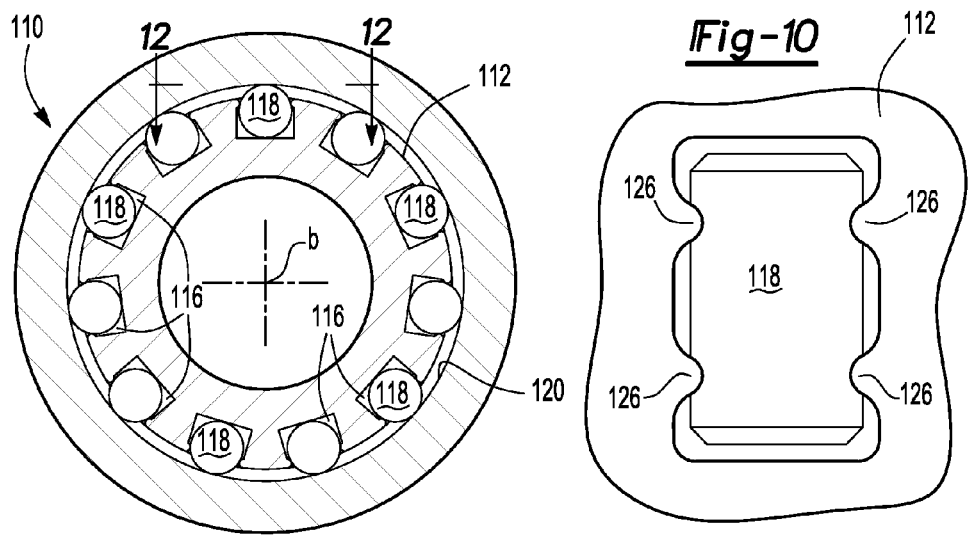
*Fig-10*
*Fig-11*
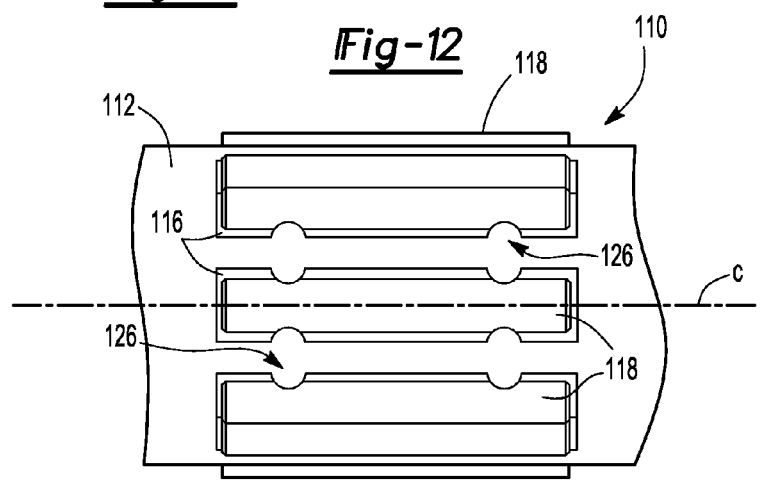
*Fig-12*

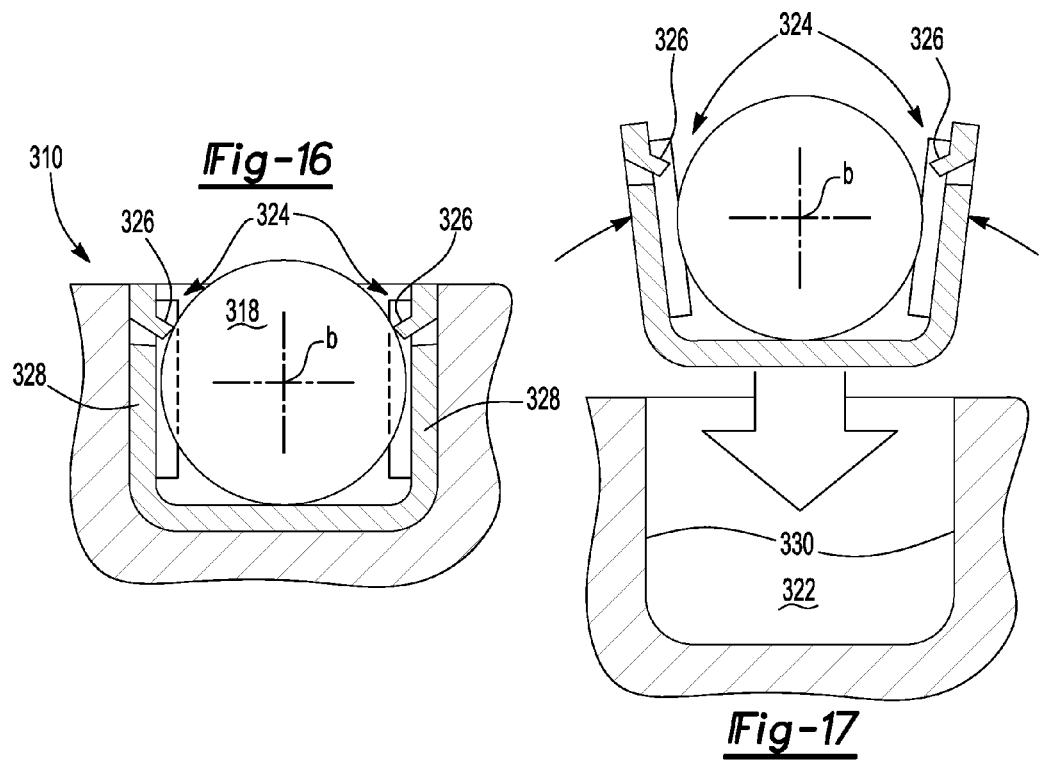
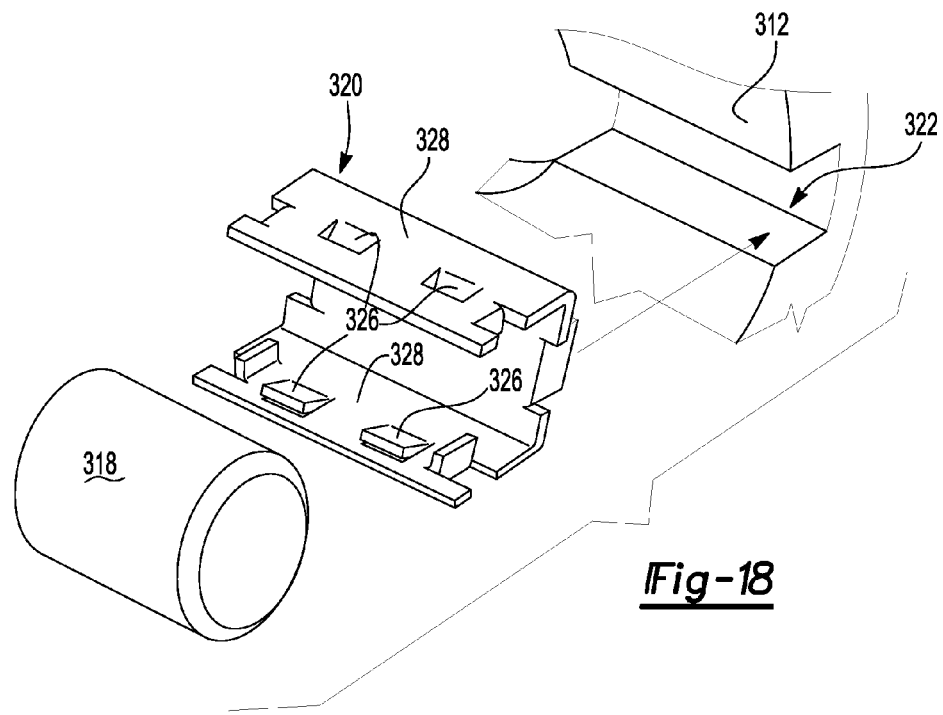

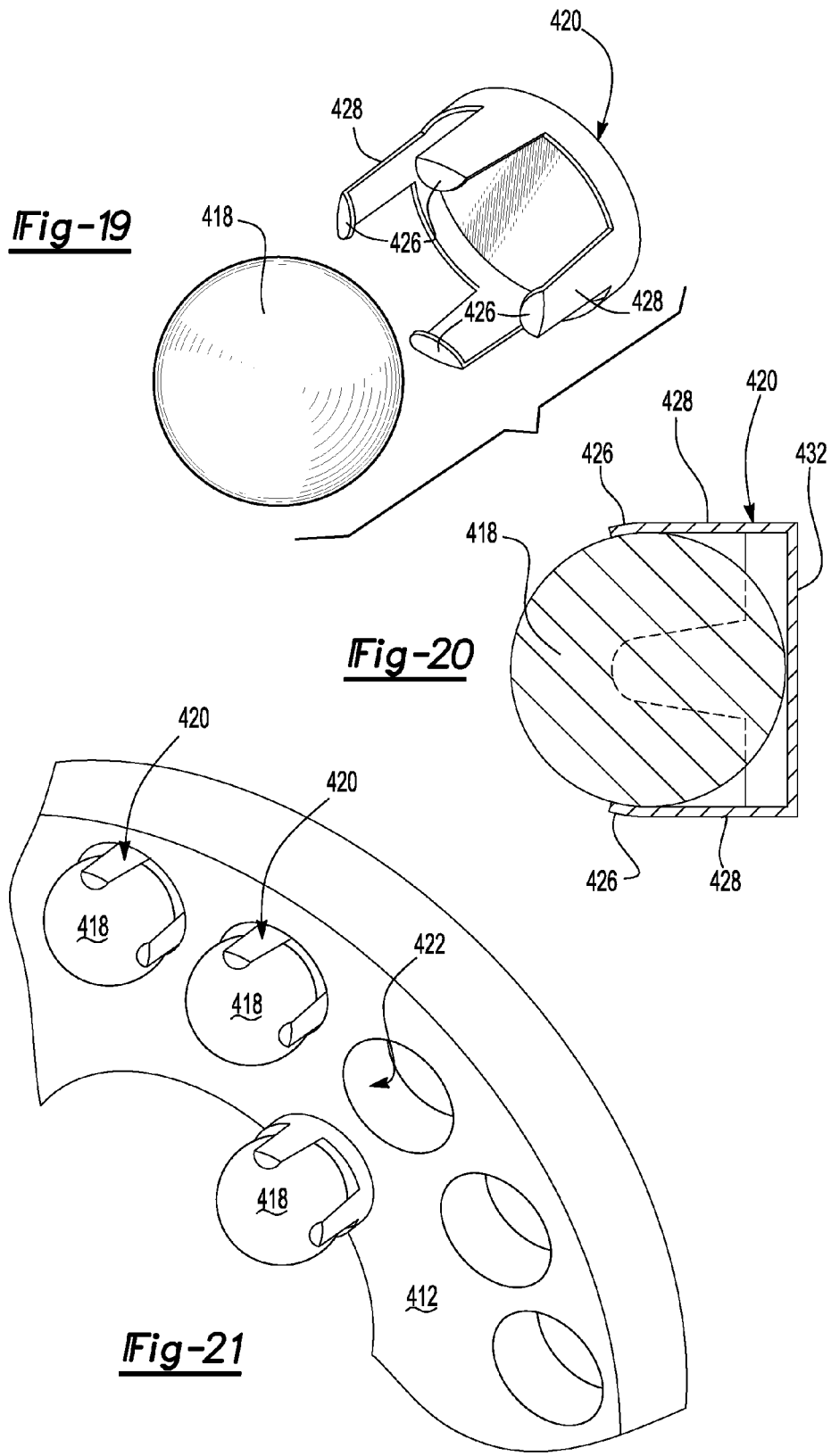

CAGELESS BEARINGS FOR USE WITH MECHANICAL DEVICES

PRIOR APPLICATION

The present application claims priority to U.S. patent application Ser. No. 14/021,251 filed on Sep. 9, 2013 that claims priority to provisional patent application No. 61/697,928 filed Sep. 7, 2012.

BACKGROUND

The present application relates generally toward a method and apparatus for reducing friction. More specifically, the present application is directed toward the method and apparatus of reducing friction between adjacent surfaces of two components of a mechanical device moving in divergent directions.

Complex mechanical assemblies transferring motive force between various components have been known to provide poor efficiencies due to frictional forces between abutting components. For example, a modern automatic transmission for a vehicle makes use of various interlocking gears to transfer motive force from a vehicle motor to a drive shaft. Any of these complex components such as, for example, planetary carriers and gears, clutch housings, torque converters and the like include a thrust surface that is smooth but abutting an adjacent thrust surface. These thrust surfaces of adjacent components move in divergent directions resulting in a loss of efficiency due to frictional forces.

To reduce the negative effect of these frictional forces, roller bearing assemblies are inserted between adjacent thrust surfaces allowing the bearings disposed within the roller bearing assembly to support and reduce the frictional forces associated with movement in divergent directions between the adjacent surfaces. However, these roller bearing assemblies are known to be expensive and consume substantial packaging space resulting in longer and more costly transmissions assemblies. Furthermore, to improve vehicle efficiency, additional clutch housing and gear assemblies have been added to the vehicle transmissions without having additional packaging space in a vehicle assembly. Therefore, it would be desirable to provide the friction reducing benefits of a bearing in these complex assemblies without requiring the use of a costly, voluminous roller bearing assembly presently in use.

SUMMARY

A method of reducing friction between adjacent surfaces of two components of a mechanical device moving in divergent directions is disclosed. A plurality of receptors is formed in at least one of the adjacent surfaces. The receptors are arranged in succession corresponding to the divergent directions of the two components. A bearing element is inserted into each of the receptors with the bearing element supporting the adjacent surfaces of the two components. A clasp is formed at the receptors for retaining the bearing element within the receptor and allowing the bearing element to rotate relative to the adjacent surfaces for reducing friction between the adjacent surfaces when the adjacent surfaces are moving in divergent directions.

The present invention provides all of the friction reducing benefits of a bearing without the use of costly and space consuming roller bearing assemblies. The bearings are now affixed to one of the two adjacent components eliminating the need to install a roller bearing assembly between the two components. Not only is the cost of the roller bearing assembly housings and bearing cages eliminated, the space associated with these housings and cages is now made available to reduce the overall size of an associated mechanical device such as, for example, a vehicle transmission.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 shows a support provided in the base of the receptor;

FIG. 10 shows a bearing element disposed within a mating surface of the alternative embodiment;

FIG. 11 shows a cross-sectional view of an alternative embodiment of the present invention;

FIG. 12 is a side view along lines 12-12 of FIG. 11;

FIG. 16 is a partial cross-sectional view of the bearing element and housing assembled into the retainer;

FIG. 17 is shows an installation of the bearing element and housing;

FIG. 18 shows an exploded perspective view of the bearing element and housing;

FIG. 19 shows an exploded perspective view of a further embodiment having a spherical bearing element and housing;

FIG. 20 shows a cross-sectional view of the further embodiment having a spherical bearing element;

FIG. 21 shows a perspective view of the further embodiment having spherical bearing element received into the mating surface;

DETAILED DESCRIPTION

Figure 1:
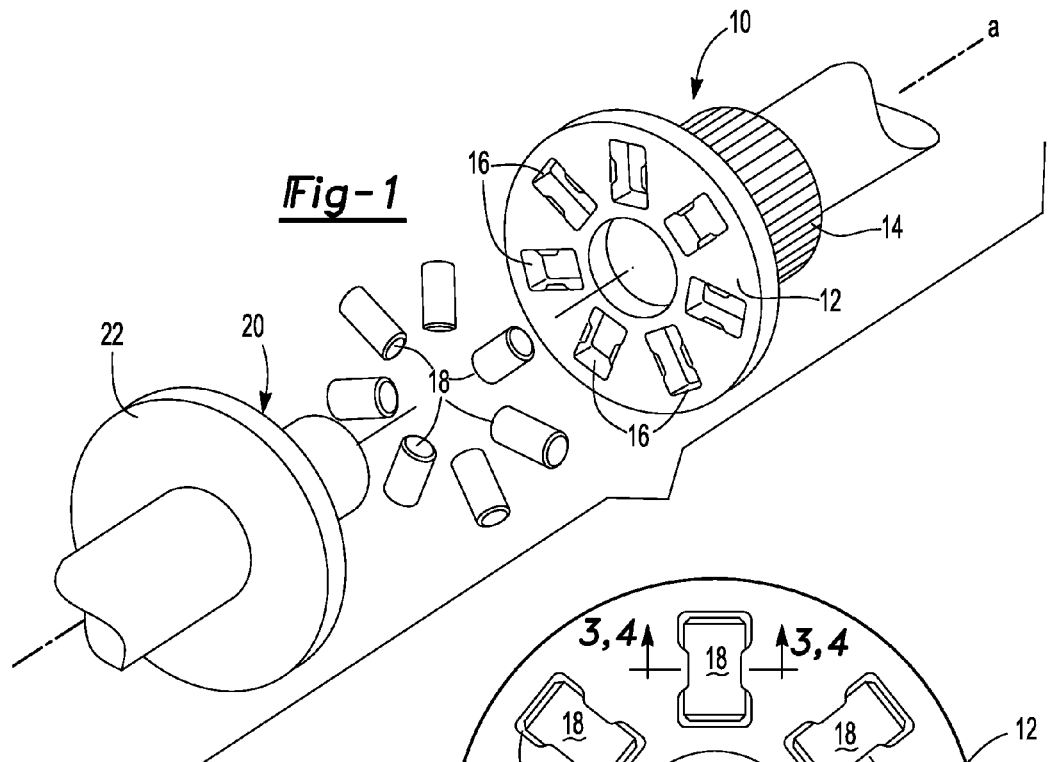
FIG. 1 shows a perspective view of one embodiment of the present invention.

Referring to FIG. 1, a rotational assembly of the present invention is generally shown at 10. The rotational assembly includes a mating surface 12 and an interlocking surface 14. The interlocking surface 14 is engaged with a cooperable interlocking member (not shown) in a known manner to drive the rotational assembly 10 in a circumferential direction around axis a. A plurality of receptors 16 is disposed in the mating surface 12 of the rotational assembly 10. A bearing element 18 is received in each receptor 16 to reduce frictional interaction between the mating surface 12 of the rotational assembly 10 and a complementary mating surface 20 of an interacting component 22.

Figure 2:
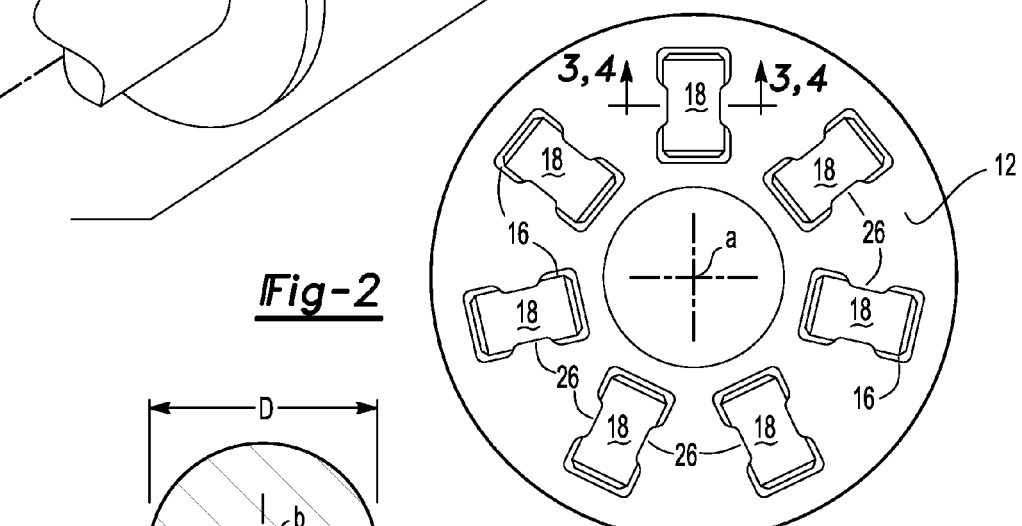
FIG. 2 shows a plan view of a mating surface of the present invention.
Figure 3:
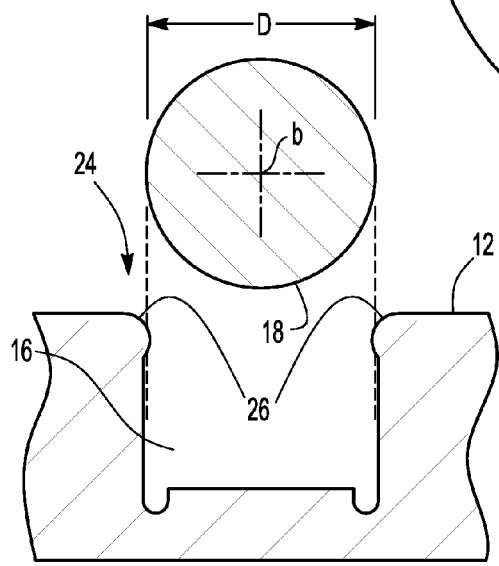
FIGS. 3 and 4 show a sectional view through lines 3-3 and 4-4 of FIG. 2 respectively.
Figure 4:
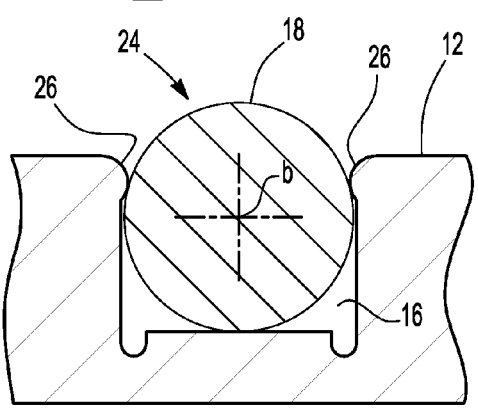

Referring now to FIGS. 2-4, the bearing elements 18 are received by the receptors 16 in a manner that allows the bearing element 18 to rotate freely while disposed in the receptor 16. A clasp 24 is formed at the receptor 16 in the mating surface 12 for retaining the bearing element 18 within the receptor 16.

In this embodiment, the clasp 24 is defined as opposing protuberances 26 formed at the receptor 16 prior to inserting the bearing element 18. It should be understood that the receptors 16 are arranged in succession corresponding to the divergent directions of the mating surface 12 and the complementary mating surface 20. Each protuberance 26 is formed prior to inserting the bearing element 18 into the receptor 16 by way of machining or alternative forming method. The distance between each protuberance 26 is slightly less than the diameter D of the bearing element 18. Therefore, upon insertion of the bearing element 18 into the receptor 16, the bearing element 18 is retained by protuberances 26. It should be understood by those of ordinary skill in the art that the bearing element 18 is received into the receptor 16 by way of to a "snap fit" interaction.

The bearing element 18 also includes a rotational axis b that is disposed slightly below an uppermost portion of the mating surface 12. Therefore, a circumferential portion of the bearing element 18 extends upwardly from the uppermost portion of the mating surface 12 providing support between the complementary mating surface 20 and the mating surface 12 so that only ten to twenty percent of the surface area of the bearing element 18 is exposed. Therefore, when the mating surface 12 is moving in a divergent direction to the complementary mating surface 20 the bearing element rotates between the two surfaces 14, 20 providing a low friction interaction. It should further be understood by those of ordinary skill in the art that the bearing element 18 can take the form of a pin or a sphere depending upon the nature of the rotational assembly 10.

An alternative embodiment of the clasp 24 is generally shown at 28 of FIGS. 5 through 8. The alternate clasp 28 in this embodiment is not preformed in the mating surface 12. In this embodiment, a staking operation is performed to deform the mating surface 12 for defining a stake 30 to retain the bearing element 18 within the receptor 16. The stake 30 is formed by way of a staking element 32 in a known manner. Alternatively, a small notch 34 is preformed in the mating surface 12 defining a web 36 that is merely deformed by the staking element 32 so that the distance between opposing webs 36 is less than a diameter D of the bearing element 18.

Figure 5:
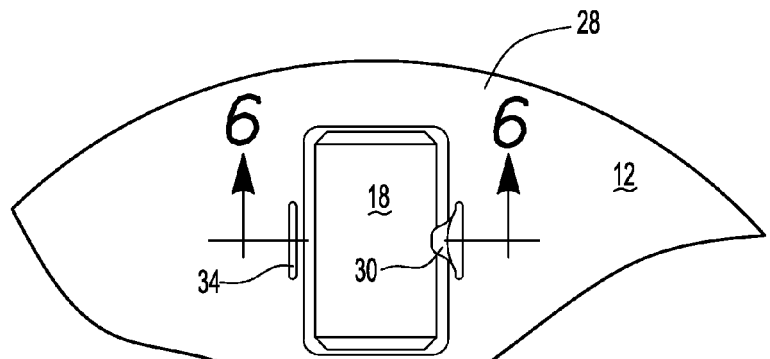
FIG. 5 shows a plan view of a bearing element of the present invention.
Figure 6:
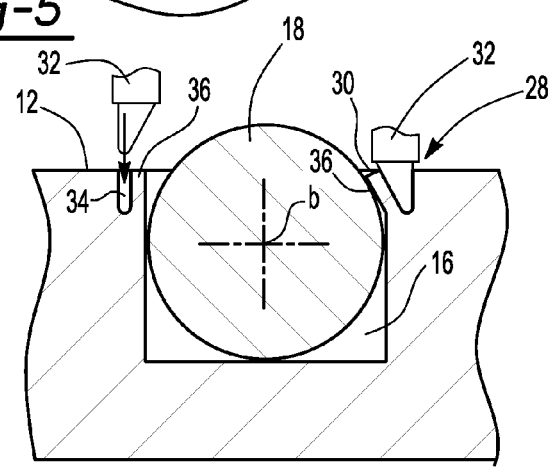
FIG. 6 shows a staking process for retaining the bearing element within a receptor.
Figure 7:
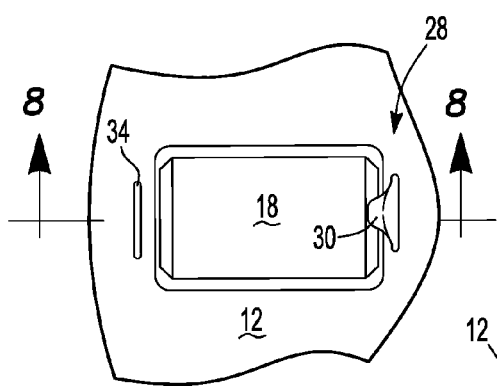
FIG. 7 shows an alternative embodiment of a receptor.
Figure 8:
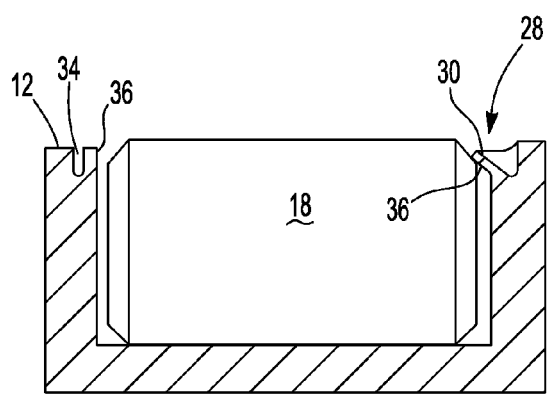
FIG. 8 shows a side view of the alternative embodiment of the retainer through line 8-8, of FIG. 7.

FIGS. 5 and 6 show the stake 30 located along a radial surface of the bearing element 18. Alternatively, FIGS. 7 and 8 show the stake 30 located along an axis b of the bearing element 18. It should also be understood to those of skill in the art that a single protuberance 26 or stake 30 will suffice to retain the bearing element 18 within the receptor 16 because the bearing element 18 need only be retained during assembly of the rotational assembly 10. Once the complementary mating surface 20 is positioned adjacent the mating surface 12 the bearing element is permanently retained within the receptor 16 by way of the interaction between the two surfaces 12, 20.

Referring now to FIG. 9, a support 38 is located at a base 40 of the receptor 16. In some instances, the rotational assembly 10 is heat treated to provide strength to the assembly in a known manner. However, it is sometimes desirable not to heat treat the rotational assembly 10 and make use of a softer metallic substrate. In this instance, a bearing element 18 could deform a base 40 of the mating surface 12 rendering the bearing element 18 not functional for its intended purpose. Therefore, it would be desirable to provide a heat treated or otherwise strengthened support 38 at the base 40 of the receptor 16 to provide additional support to the bearing element 18.

FIGS. 10 through 14 disclose an alternative rotational assembly 110 where the mating surface 112 is not planar, but cylindrical. In the following exemplary embodiment, like elements to the prior embodiment are merely identified in the 100 series of elements. The alternative assembly 110 includes an assembly axis c around which the mating surface 112 is disposed. The mating surface 112 is adjacent a complementary mating surface 120 each of which rotate around axis c in divergent directions around axis c. It should be understood by those of skill in the art that this embodiment includes clockwise and counterclockwise rotation of either of the mating surfaces 112, 120 around axis c. Bearing elements 118 are disposed in receptors 116 and support the complementary mating surface 120 against the mating surface 12. The bearing elements 18 are received by the receptor 16 in a manner similar to that defined above. Furthermore, the clasp 124 used to retain the bearing element 118 within the receptor 116 is similar to that set forth above in the prior embodiment. FIG. 10 represents parallel opposing protuberances 26 that define the clasp 28.

Figure 13:
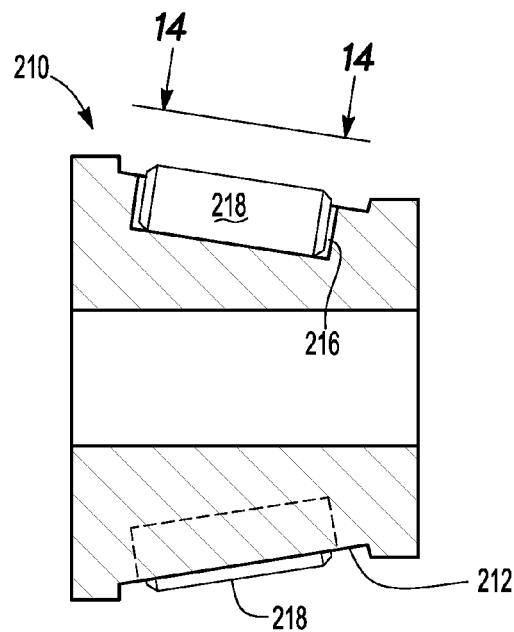
FIG. 13 is a further embodiment of the present invention.
Figure 14:
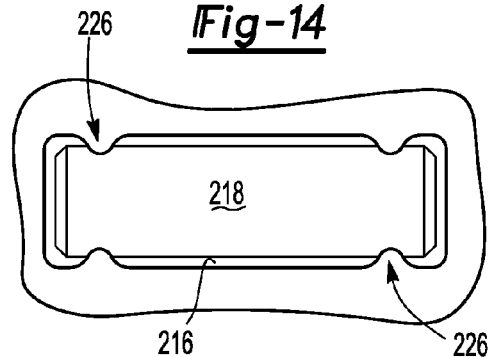
FIG. 14 shows a bearing element disposed in a receptor of the alternative embodiment.

FIGS. 13 and 14 show a further embodiment where like elements to that described above are defined in the 200 series of element numbers takes the form of an inner race. In this embodiment of the rotational assembly 210 the mating surface 212 is not cylindrical but frustoconical by design. However, the frustoconical mating surface 212 makes use of the bearing elements to 18, which are received by receptors 216 in a similar manner as described above. In this embodiment, the bearing element 218 is retained in receptor 216 by way of protuberances 226 similar to that defined above. It should be understood to those of skill in the art that an outer raced may also include receptors 216 and the bearing element 218. It should also be understood by those of skill in the art that locating the receptors 216 on the outer race will induce lubricant into the receptors 216 through centrifugal forces.

Figure 15:
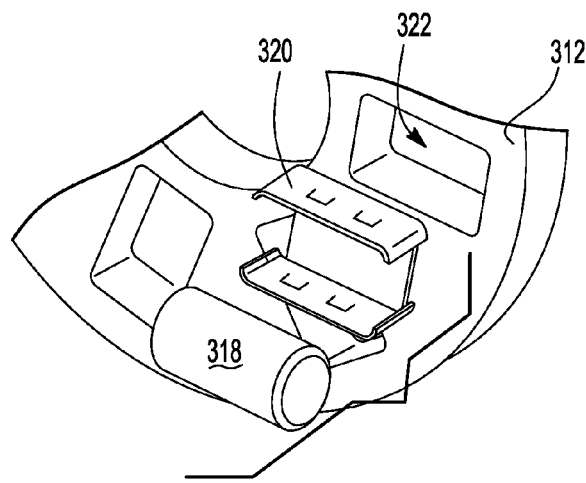
FIG. 15 shows an exploded view of a further alternative embodiment having a housing.
Figure 22:
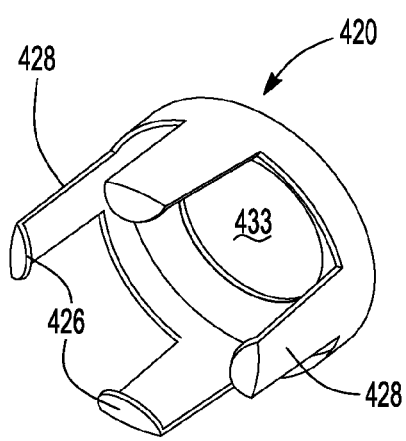
FIG. 22 shows a perspective view of an alternative housing for use with a spherical bearing element.
Figure 23:
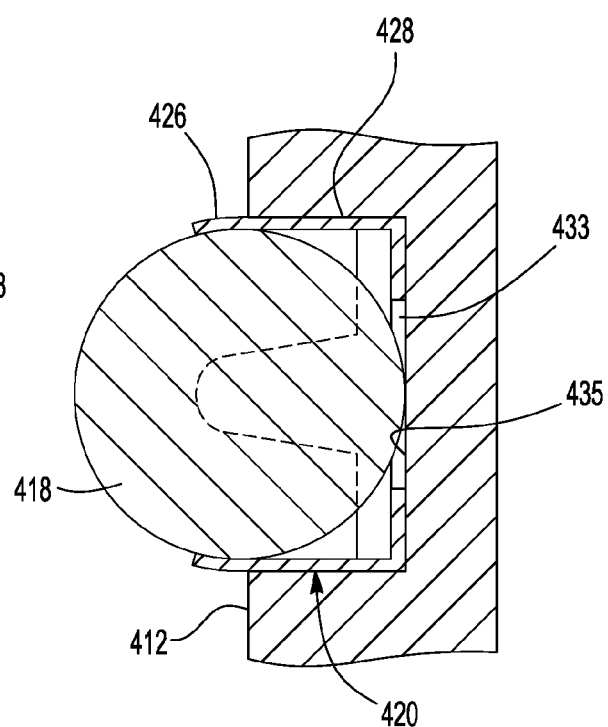
FIG. 23 shows a cross-sectional view of the spherical bearing element and housing inserted into the receptor.

A further alternative embodiment is shown in FIGS. 15 through 23. Referring to FIG. 15, where like elements to prior embodiments include the same element numbers in the 300 series, a bearing 318 taking form of a needle or cylinder is received by a housing 320. The housing 320 is received in alternative receptor 322 disposed in the mating surface 312 of the assembly 310.

As best shown in FIGS. 16 through 18, each housing includes a catch 324 defined by opposing tabs 326. Each tab 326 is disposed in opposing members 328. Prior to being inserted into the receptor, the opposing members 328 are disposed to allow easy insertion of the bearing element 318 into the housing. Therefore, the opposing members 328 are biased to separate the opposing tabs 326 a distance greater than the diameter of the bearing element 318. As shown in FIG. 17, the opposing members 328 are forced inwardly by opposing walls 330 of the receptor 322 upon insertion of the housing 320. Therefore, the distance spacing the opposing tabs 326 is less than the diameter of the bearing element 318 retaining the bearing element 318 in the housing 320.

It is contemplated by the inventor that the housing 320 is retained by the receptor 322 merely by way of pressure from the complementary mating surface 20. Alternatively, the housing 320 is retained by way pressure from the biased opposing members 328. Once the mating surface 12 is matched to the complementary mating surface 20, the bearing elements 18, 118, 218, 318, 418 and the housing 320, 420 cannot be removed unless the assembly 10 is disassembled.

A still further embodiment is shown in FIGS. 19-21 where like elements to prior embodiments keep the same element numbers, except in the four hundred series. In this embodiment, the bearing element 418 takes the form of a sphere. The bearing element 418 is received in the housing 420 where it is allowed unlimited rotational motions similar to that of ball bearing. The housing 420 includes a plurality of opposing members 428. Although four opposing members 428 are shown, it should be understood by those of ordinary skill in the art that more or less opposing members 428 may be included to fit a particular application. As set forth above, the opposing members 428 retain the bearing element 428 in the housing 420 while the housing is inserted into the receptor 422 disposed in the mating surface 412.

Tabs 426 are disposed at distal end of each of the opposing members 428. The opposing tabs 426 are spaced a distance that is less than the diameter D of the bearing element 428. Therefore, the bearing element 428 is retained by the opposing tabs 426 via a snap-fit and a floor 431 disposed at an opposite end of the opposing members 428 from the tabs 426. In this embodiment, the floor 431 defines an opening 433 allowing the bearing element 428 to rotate against a base 435 of the receptor 422.

In a similar manner as the prior embodiments, a circumferential extent of the bearing element 428 extends beyond the mating surface 412 so that the complementary mating surface 20 abuts the bearing element 428 and not the mating surface 412 providing a reduced frictional interaction due to the rotational attributes of the bearing element 428.

A further enhancement is to coat the housing 320, 420 with a non-conductive coating or even manufacture the housing out of a non-conductive material. It is known that bearing units used in electric motors are subject to electrical current, which degrades the bearing. The use of non-conductive materials by way of coatings or substrate will insulate the bearing from detrimental electrical current.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A rotational assembly having a mating surface and an interlocking surface disposed in driving engagement with a cooperable interlocking member of a driving mechanism, comprising:
   a plurality of receptors defined in said mating surface; and
   a bearing element disposed in a housing received in each of said plurality of receptors for reducing frictional interaction between said mating surface of said rotational assembly and a complementary mating surface of an interacting component; with said housing retaining said bearing element in rotational engagement with said complementary mating surface;
   wherein each of said housings includes opposing members and a floor spaced from a distal end by said opposing members.

2. The assembly set forth in claim 1, wherein each of said housings includes a catch for pivotally retaining said bearing element therein.

3. The assembly set forth in claim 1, wherein each of said bearing elements includes a circumferential extent being disposed outwardly of said housing.

4. The assembly set forth in claim 1, wherein each of said opposing members defines a tab with opposing tabs defining a catch for pivotally retaining said bearing element within said housing.

5. The assembly set forth in claim 4, wherein said opposing tabs are spaced a distance less than a diameter of said bearing element.

6. The assembly set forth in claim 4, wherein each of said opposing members is deflected radially inwardly by said receptor for pivotally retaining said bearing element therein.

7. The assembly set forth in claim 1, wherein said bearing element defines a sphere or a cylindrical pin.

8. The assembly set forth in claim 1, wherein said bearing element prevents said complementary mating surface from contacting said mating surface.

9. The assembly set forth in claim 1, wherein said bearing element includes an axis disposed inwardly of said distal end.

10. The assembly set forth in claim 1, wherein said floor of said housing includes an opening allowing said bearing element to abut said receptor.

* * * * *